US008166390B2

(12) United States Patent
Fortes et al.

(10) Patent No.: US 8,166,390 B2
(45) Date of Patent: Apr. 24, 2012

(54) FIGURE SIZING AND POSITIONING ON DYNAMIC PAGES

(75) Inventors: Filipe Fortes, Seattle, WA (US); Gregory A. Hermann, Renton, WA (US); Grzegorz A. Zygmunt, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 1143 days.

(21) Appl. No.: 11/354,675

(22) Filed: Feb. 15, 2006

(65) Prior Publication Data
US 2007/0192686 A1 Aug. 16, 2007

(51) Int. Cl.
*G06F 17/00* (2006.01)
(52) U.S. Cl. .................................. 715/238; 715/788
(58) Field of Classification Search .................. 715/238
See application file for complete search history.

(56) References Cited

U.S. PATENT DOCUMENTS

| | | | | |
|---|---|---|---|---|
| 5,060,170 A * | 10/1991 | Bourgeois et al. | ............ | 715/788 |
| 5,796,401 A * | 8/1998 | Winer | ............ | 345/619 |
| 6,023,714 A * | 2/2000 | Hill et al. | ............ | 715/235 |
| 6,750,887 B1 * | 6/2004 | Kellerman et al. | ............ | 715/788 |
| 6,826,727 B1 * | 11/2004 | Mohr et al. | ............ | 715/235 |
| 7,093,196 B1 * | 8/2006 | Griffiths et al. | ............ | 715/246 |
| 7,251,778 B1 * | 7/2007 | Hill et al. | ............ | 715/210 |
| 7,366,989 B2 * | 4/2008 | Naik et al. | ............ | 715/736 |
| 7,441,047 B2 * | 10/2008 | Gibbs et al. | ............ | 709/248 |
| 7,716,568 B2 * | 5/2010 | Ido et al. | ............ | 715/204 |
| 7,747,782 B2 * | 6/2010 | Hunt et al. | ............ | 709/246 |
| 7,770,108 B2 * | 8/2010 | Fiedorowicz et al. | ........ | 715/236 |
| 2003/0037076 A1 * | 2/2003 | Bravery et al. | ............... | 707/517 |
| 2003/0067489 A1 * | 4/2003 | Candy Wong et al. | ........ | 345/765 |
| 2003/0079177 A1 * | 4/2003 | Brintzenhofe et al. | ........ | 715/500 |
| 2003/0097397 A1 * | 5/2003 | Giannetti | ....................... | 709/201 |
| 2003/0204816 A1 * | 10/2003 | Simard et al. | .................. | 715/517 |
| 2003/0236917 A1 * | 12/2003 | Gibbs et al. | ................... | 709/248 |
| 2004/0001087 A1 * | 1/2004 | Warmus et al. | ............... | 345/745 |
| 2004/0027375 A1 * | 2/2004 | Ellis et al. | ....................... | 345/753 |
| 2004/0085345 A1 * | 5/2004 | Galou et al. | ................... | 345/734 |
| 2004/0205623 A1 * | 10/2004 | Weil et al. | ...................... | 715/525 |
| 2005/0094207 A1 * | 5/2005 | Lo et al. | ......................... | 358/1.18 |
| 2005/0108678 A1 * | 5/2005 | Goodwin et al. | .............. | 717/100 |
| 2005/0138550 A1 * | 6/2005 | Dermler et al. | ................ | 715/517 |
| 2005/0223320 A1 * | 10/2005 | Brintzenhofe et al. | ........ | 715/517 |
| 2005/0246632 A1 * | 11/2005 | Guido et al. | ................... | 715/517 |
| 2006/0100978 A1 * | 5/2006 | Heller et al. | ...................... | 707/1 |
| 2006/0242590 A1 * | 10/2006 | Polivy et al. | ................... | 715/760 |

* cited by examiner

*Primary Examiner* — Doug Hutton, Jr.
*Assistant Examiner* — Benjamin Smith
(74) *Attorney, Agent, or Firm* — Microsoft Corporation

(57) ABSTRACT

Various technologies and techniques are disclosed that provide ways to position, size, and/or anchor page elements for display on varying output devices. A user can assign rendering specifications to both text and graphic elements. Rendering specifications include, but are not limited to width, height, anchor(s), and/or offset(s) to one, some, or all page elements. Page elements will appear in the positions and relationships to each other as specified in the source document.

20 Claims, 10 Drawing Sheets

APPLICATION PROGRAM INTERFACE (API)
500

DYNAMIC PAGE SIZING ATTRIBUTES
502

+ Width  504

+ Height  506

+ HorizontalAnchor  508

+ VerticalAnchor  510

+ HorizontalOffset  512

+ VerticalOffset  514

FIG. 6

FIGURE SIZING AND POSITIONING ON DYNAMIC PAGES

BACKGROUND

Both consumers and businesses are acquiring an increasingly diverse array of computers and digital output devices. These devices offer options for displaying content in ways that were only dreamed of a decade or two ago. For example, you can read e-mails on your computer at work, your PDA, or your mobile phone. Content can also be broadcast on oversized plasma screens in corporate conference rooms and classrooms, LED displays in lobbies, LCD panels at trade shows, TVs in waiting rooms, or scrolling ticker tapes over entryways, to name just a few options. While the increased versatility offers great diversity in communicating both text-based and image-based content, problems arise with how readily the content can conform to output devices of varying sizes and/or aspect ratios. Some display formats may be horizontally oriented (as in a computer monitor or TV monitor); others may be vertically oriented (as in a PDA or mobile phone).

In the print world, designers and other users work with a fixed page or canvas size. They decide what elements will compose a page and where those elements should be located based on their knowledge of the page size. Current technologies are limited in their ability to define page content so that it will reflow suitably when the page size of the output display is dynamic or is unknown. Furthermore, when a user desires for content to be rendered on multiple devices, problems arise. One of two things may happen: 1) the user must change the page content or layout to suit multiple target output devices, or 2) the user can rely on existing page reflow technology to resize the page content appropriately. In the latter case, images or content may "jump" to different lines or locations. Columns or pages of content can be split. Size and/or position of content can be changed or compromised.

SUMMARY

Various technologies and techniques are disclosed that provide ways to position, size, and/or anchor page elements for display on varying output devices. A user can assign rendering specifications to both text and graphic elements. Rendering specifications include, but are not limited to height, width, anchor(s), and/or offset(s) to one, some, or all page elements. Page elements will appear in the positions and relationships to each other as specified in the source document, regardless of whether dynamic sizing on the output device changes the source document's dimensions and/or aspect ratio.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 6 is an object diagram of a dynamic page sizing/positioning program for one implementation of the system of FIG. 1.

DETAILED DESCRIPTION

Figure 1:
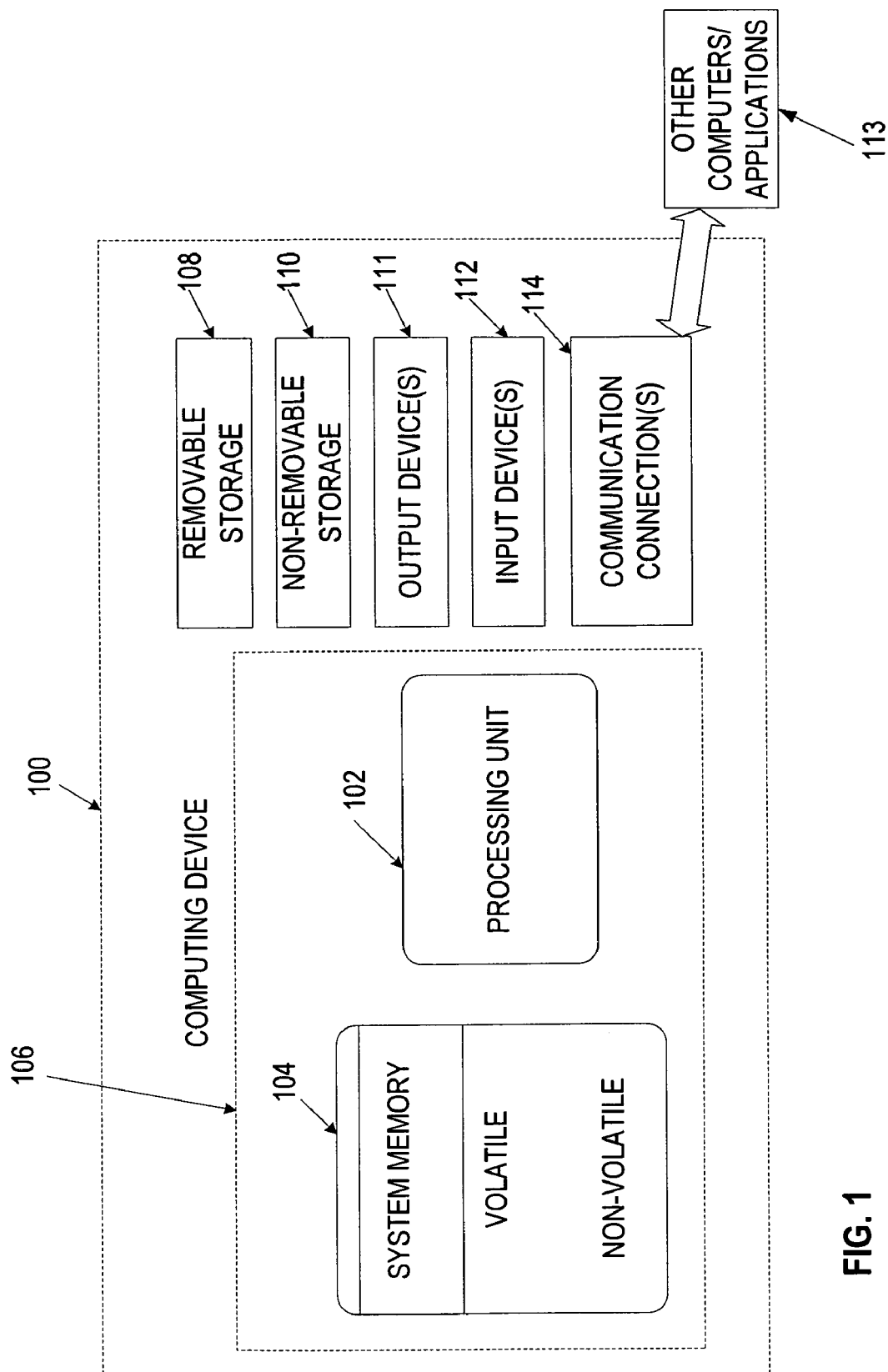
FIG. 1 is a diagrammatic view of a computing device of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as an application that enables users to size, position, and anchor page content so it is rendered correctly on varying output devices, but the system also serves other purposes in addition to these. In one implementation, one or more of the techniques described herein can be implemented as features within a sub-system of an operating system such as MICROSOFT® WINDOWS® or Linux, or from any other type of program or service that is responsible for accessing, interpreting and/or rendering content in documents for display on an output device. In another implementation, one or more of the techniques described herein can be implemented as features within a program such as MICROSOFT® Office Word or Adobe InDesign, or from any other type of program or service that allows assignment of page content positioning and/or sizing attributes.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with one or more computers and/or applications 113. Device 100 may also have input device(s) 112 such as keyboard, mouse, pen, voice input device, touch input device, etc. Output device(s) 111 such as a monitor, speakers, printer, PDA, mobile phone, and other types of digital display devices may also be included. These devices are well known in the art and need not be discussed at length here.

Figure 2:
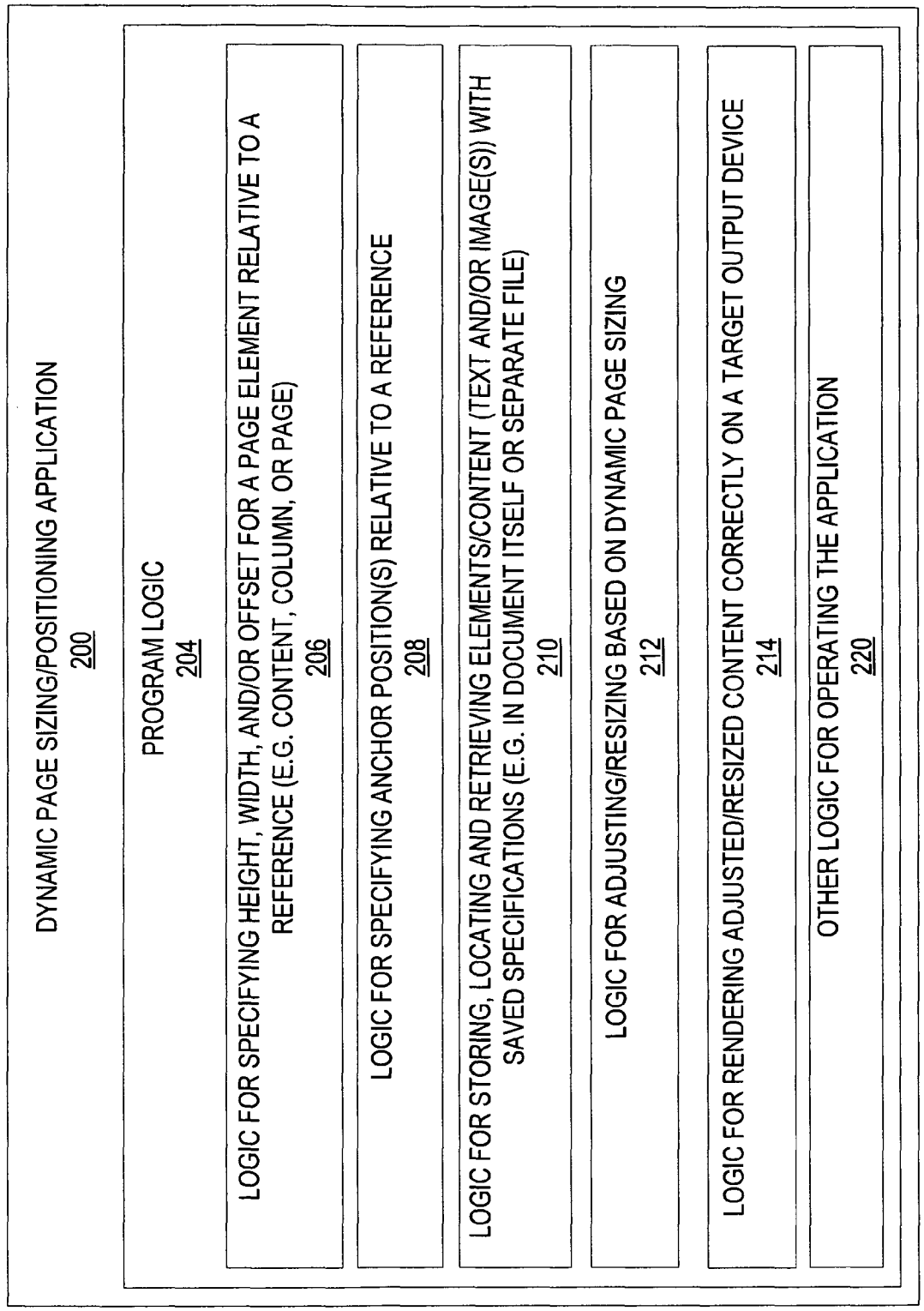
FIG. 2 is a diagrammatic view of a dynamic page sizing/positioning program operating on the computer system of FIG. 1.

Turning now to FIG. 2 with continued reference to FIG. 1, dynamic page sizing/positioning application 200 is illustrated. In one implementation, dynamic page sizing/positioning application 200 is one of the application programs that reside on computing device 100. Alternatively or additionally, one or more parts of dynamic page sizing/positioning application 200 can be part of system memory 104, on other computers and/or applications 113, or other such variations as would occur to one in the computer software art.

Dynamic page sizing/positioning application 200 includes program logic 204, which is responsible for carrying out some or all of the techniques described herein. Program logic 204 includes logic for specifying height, width, and/or offset relative to one or more references (e.g. content, column, or page) 206; logic for specifying one or more anchor positions for one or more page elements 208; logic for storing, locating and retrieving elements/content according to saved specifications (e.g. in the document itself or a separate file) 210; logic for adjusting/resizing elements based on dynamic page sizing 212; logic for rendering adjusted/resized content correctly on a target output device 214; and other logic for operating the application 220. In one implementation, program logic 204 is operable to be called programmatically from another program, such as using a single call to a procedure in program logic 204.

In one implementation, program logic 204 resides on computing device 100. However, it will be understood that program logic 204 can alternatively or additionally be embodied as computer-executable instructions on one or more computers and/or devices and/or in different variations than shown on FIG. 2.

Figure 3:
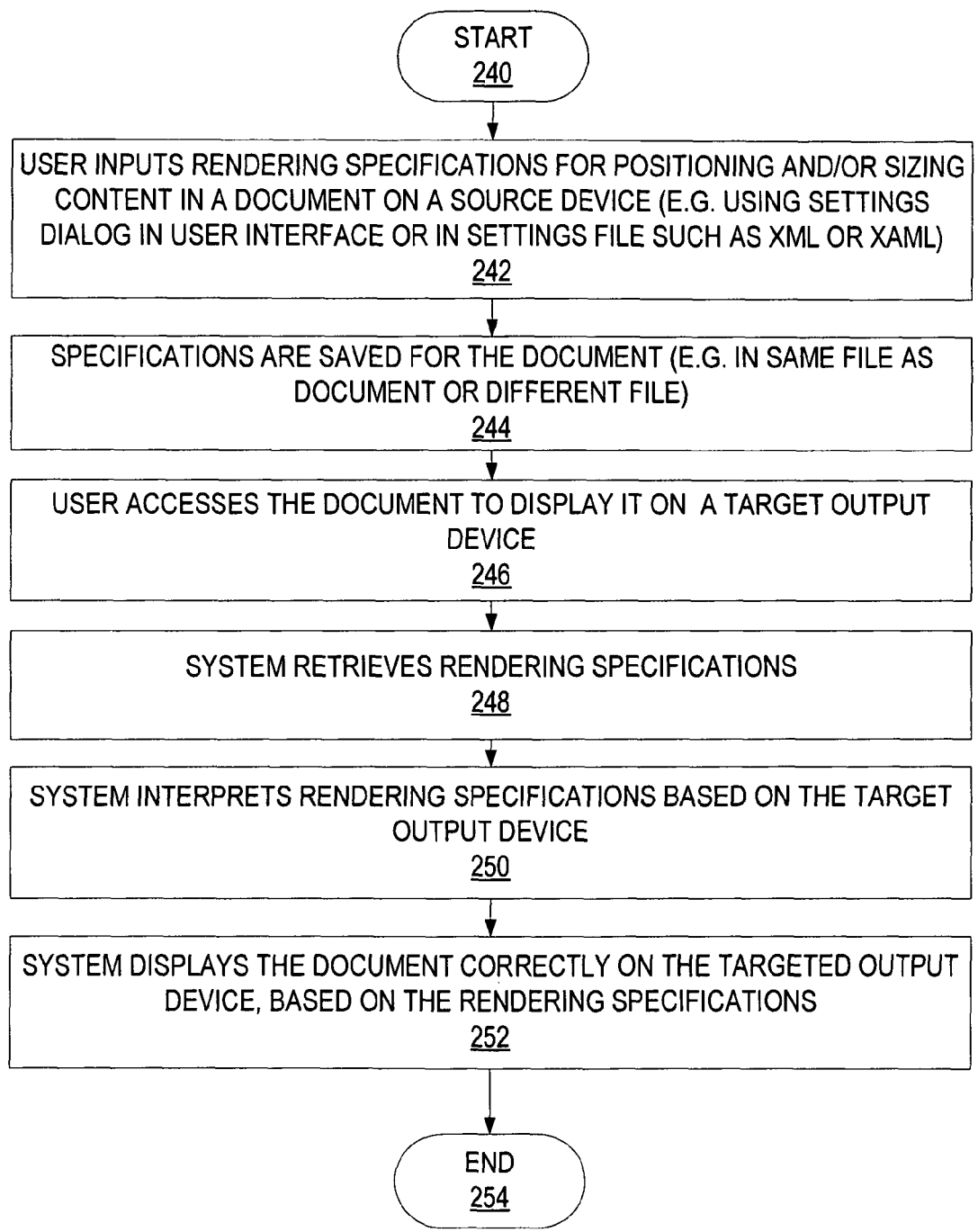
FIG. 3 is a high-level process flow diagram for one implementation of the system of FIG. 1.
Figure 4:
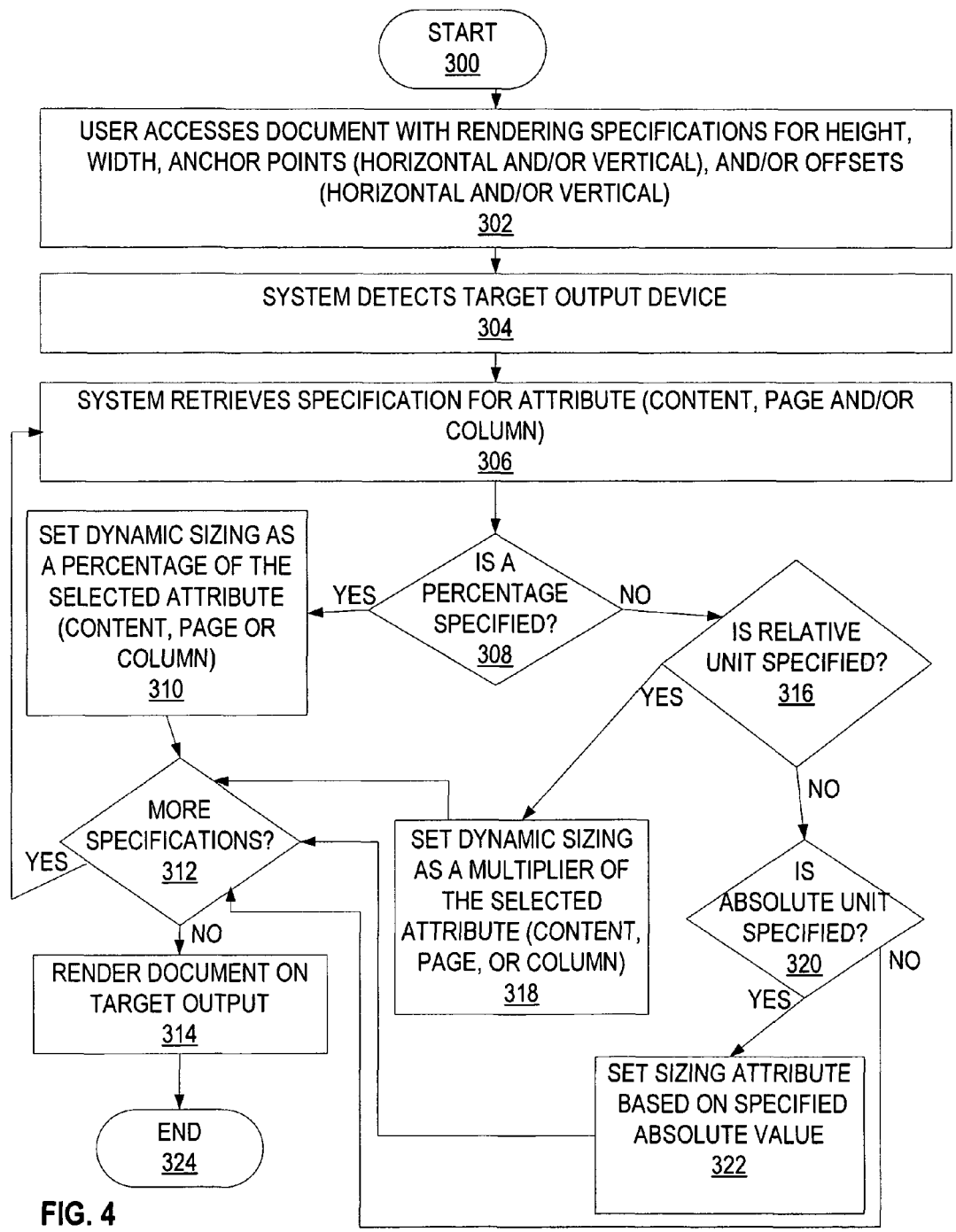
FIG. 4 is a process flow diagram for one implementation of the system of FIG. 1 that illustrates detecting a target output device and rendering the document on the target output device according to the rendering specifications.

Turning now to FIGS. 3-4 with continued reference to FIGS. 1-2, the stages for implementing one or more implementations of dynamic page sizing/positioning application 200 are described in further detail. FIG. 3 is a high level process flow diagram for dynamic page sizing/positioning application 200. In one form, the process of FIG. 3 is at least partially implemented in the operating logic of computing device 100.

The procedure begins at start point 240 with a user specifying rendering specifications for positioning and/or sizing content in a document on a source device, such as using a settings dialog in a user interface or in a settings file such as extensible application markup language (XAML) (stage 242). As one non-limiting example, a user can enter one or more dynamic sizing attributes for any page element, whether the element is text or a graphic. A user can specify the height and width of a page element, and/or its position relative to other elements on the page. Additionally, the user can specify one or more anchor points. The system uses program logic 210 to save the sizing and positioning attributes (stage 244), such as in the same file as the document or in a different file. When a user accesses the document to output the document's content on a target output device (stage 246), the system uses program logic 210 to retrieve the rendering specifications (stage 248) and program logic 212 to adjust/resize the page as needed to fit the requirements of the target output device (stage 250). Program logic 214 is executed to render/display the output on a target display according to the rendering specifications (stage 252). Thus, regardless of whether the output is on a large-screen TV or a mobile phone, the page can be displayed with the position and relative size of the elements preserved. The process ends at end point 254.

FIG. 4 illustrates one implementation of a more detailed process for dynamic page sizing/positioning application 200. In one form, the process of FIG. 4 is at least partially implemented in the operating logic of computing device 100. The procedure begins at start point 300 with the user retrieving a document that includes rendering specifications already set for dynamic page sizing/positioning (stage 302). In one implementation, these specifications can include height, width, anchor points (horizontal and/or vertical), and/or offsets (horizontal and/or vertical). The system detects the target output device (stage 304). The system retrieves the saved sizing and positioning attributes, such as content, page, and/or column, for a first element (stage 306). If the value specified is a percentage (decision point 308), then dynamic sizing is set as a percentage of that attribute (stage 310). One non-limiting example of this would be a text block that fills 25% of the page. If the value specified is a relative unit (decision point 316), then the number can express a multiplier of a unit (stage 318). One non-limiting example of this would be a page heading specified as 2 columns wide. Another non-limiting example of this would be an image specified as 0.5 page, or half a page.

If the value is an absolute unit (decision point 320), then the sizing attribute is set based on the specified absolute unit value (stage 322). A few non-limiting examples of absolute units include pixels, points, centimeters, and so on. After the system recognizes and retrieves one attribute, or if the system is unable to identify the attribute, then it searches for another (decision point 312). The process continues until all attributes are recognized retrieved. Then the system uses program logic 212 and 214 to adjust/resize and render the content in a manner that is appropriate to the target output device (stage 314). The process ends at end point 324.

In one implementation, the process of FIG. 4 allows the user to specify number values as either relative or absolute. If a size is specified as an absolute value, the dynamic page sizing/positioning application 200 will determine if sufficient space exists on the current page to apply that attribute. If there is insufficient space on the current page, then that element may be pushed to the next page by the application. However, it may still be positioned at the same relative location on that subsequent page.

Alternatively or additionally, assigned attributes may be checked for validity. Thus, if a page element is sized as three (3) columns wide but only two (2) columns exist on a page, the system will recognize two (2) columns as the maximum size available and will size the element according to the maximum allowable size. The same may apply for anchoring attributes.

Figure 5:
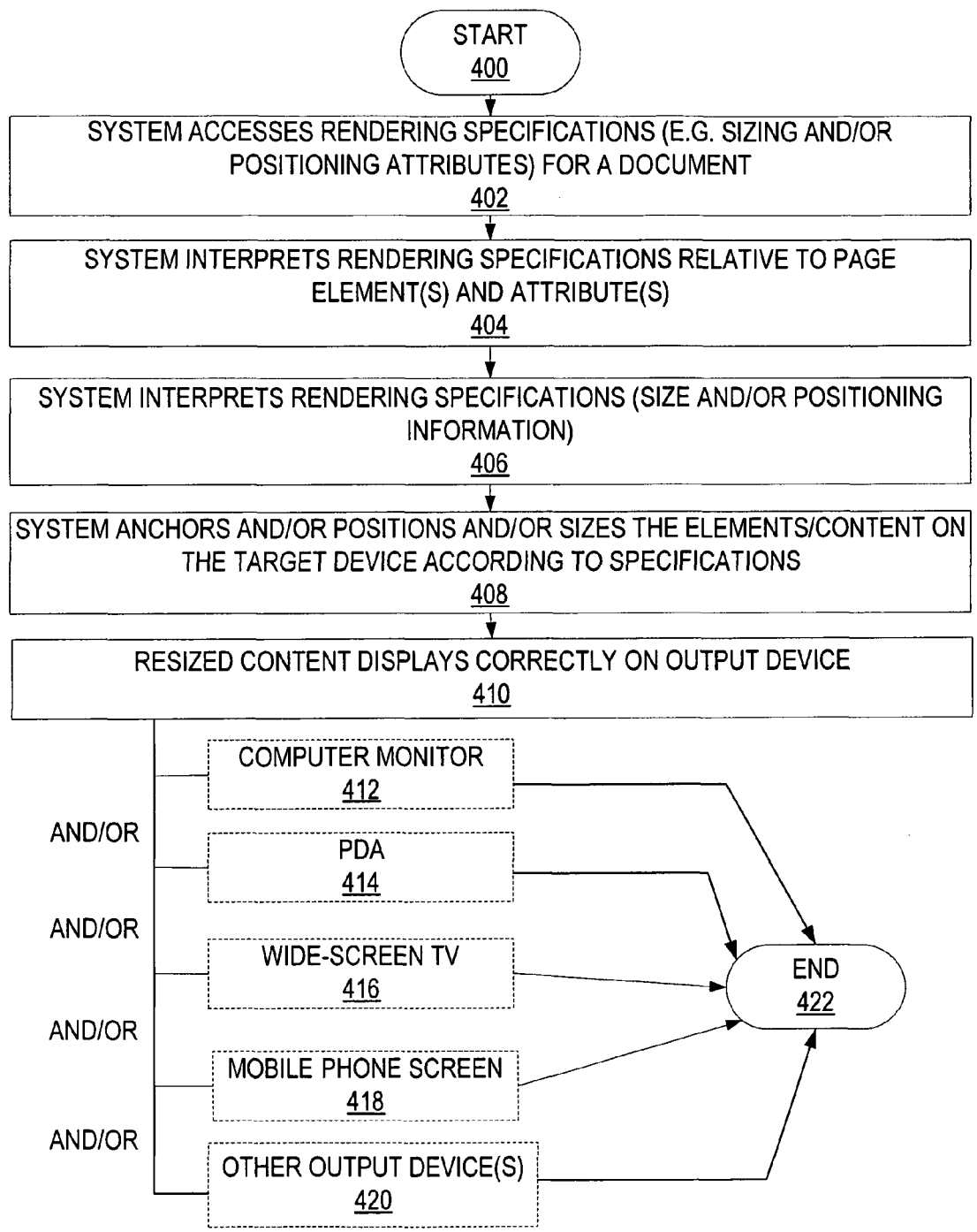
FIG. 5 is a process flow diagram for one implementation of the system of FIG. 1 that illustrates one or more possibilities of rendering content on various output devices.

Turning now to FIG. 5 with continued reference to FIG. 2, multiple output options for one or more implementations of dynamic page sizing/positioning application 200 are described. In one form, the process of FIG. 5 is at least partially implemented in the operating logic of computing device 100. The display view options and others like it can be displayed to user(s) on output device(s) 111. The process begins at start point 400 with the system recognizing user input of sizing and/or positioning rendering specifications for a dynamic page (stage 402). The system interprets the rendering specifications (stage 404) and interprets the size and/or positioning information (stage 406) to compile the page using dynamic page attributes. When a user accesses this information by opening a document and specifying a target output device, the system anchors and/or positions and/or sizes the elements/content on the target device according to the rendering specifications (stage 408). The document content is adjusted/resized accordingly on the target output device (stage 410) and may be displayed on any number of devices, including, but not limited to a computer monitor (stage 412), a PDA (stage 414), a wide-screen TV (stage 416), a mobile phone screen (stage 418), and/or other output device(s) (stage 420). The process ends at end point 422. In one implementation, a user needs only to enter the parameters for dynamic page sizing/positioning once. After it is saved, it can be rendered effectively on a number of output devices.

It will be appreciated that some, all, or additional stages than as listed in the FIGS. 3-5 herein could be used in alternate implementations, and/or in a different order than as described.

FIG. 6 illustrates an exemplary API 500 of one implementation for dynamic page sizing/positioning application 200 with its accompanying procedures. One or more of the following dynamic page sizing attributes 502 can be set for one or more elements in the document.

Width 504—Specifies the horizontal dimension of the page element to which this attribute can be applied.
  Height 506—Specifies the vertical dimension of the page element to which this attribute can be applied.
  HorizontalAnchor 508—Specifies which part of the page, column, or content that the page element may be anchored to horizontally when this attribute is applied.
  VerticalAnchor 510—Specifies which part of the page, column, or content the page element may be anchored to vertically when this attribute is applied.
  HorizontalOffset 512—Specifies how far the left or right side of a page element may be offset from the page, column, or content when this attribute is applied.
  Vertical offset 514—Specifies how far the top or bottom of a page element may be offset from the page, column, or content when this attribute is applied.

By way of example and not limitation, anchors and/or offsets may be designated as left, right, center, top or bottom.

Figure 7:
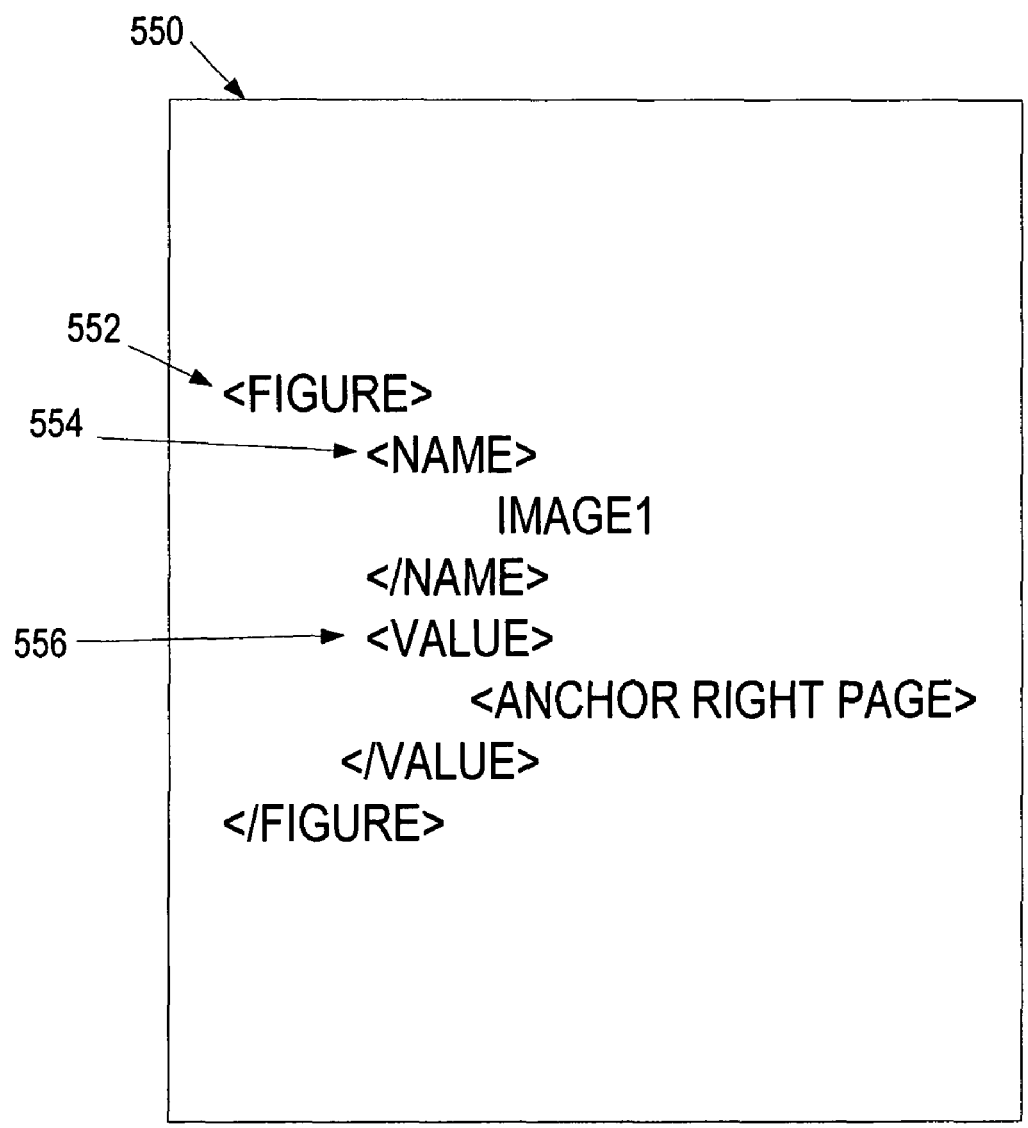
FIG. 7 is a sample markup file for one implementation of the system of FIG. 1 illustrating one way to specify dynamic page sizing/positioning attributes.

FIG. 7 illustrates an exemplary settings file 550 for one implementation that contains rendering specifications for a particular exemplary document. In the implementation shown, settings file 550 uses a text-based markup language, such as extensible markup language (XML) or extensible application markup language (XAML). File 550 contains a figure tag 552, with a name tag 554 and a value tag 556. Name tag 554 specifies the name of the element to apply the rendering specifications to. Value tag 556 specifies the particular rendering specification, which in this example is anchor right page. Numerous other ways for representing one or more rendering specifications could also be used.

Figure 8:
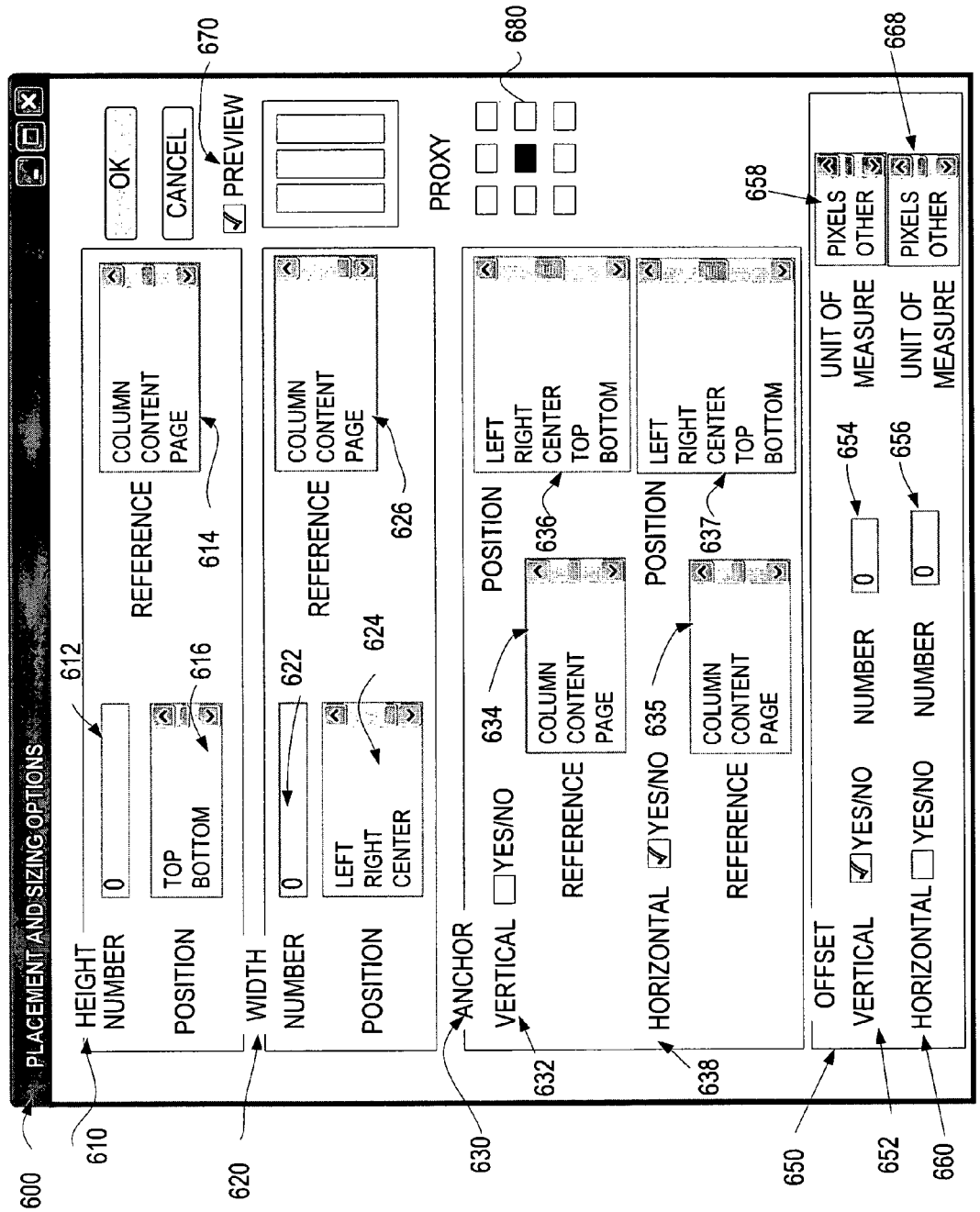
FIG. 8 a simulated screen for one implementation of the system of FIG. 1 illustrating how one or more attributes may be specified using a dialog box in a user interface.

FIG. 8 illustrates a simulated screen 600 illustrating a user interface that allows a user to view and interact with one implementation of dynamic page sizing/positioning application 200. This screen and/or others like it can be displayed to user(s) on output device(s) 111. By way of example and not limitation, a dialog box containing size and position attributes may appear when a user activates a specific key or key combination (such as one or more "hot keys") or initiates a mouse activity (such as a right click). Alternatively or additionally, a dialog box containing placement and sizing options may be called from a menu selection.

The attributes that a user can specify include Height 610, Width 620, Anchor 630, and Offset 650. One or more attributes may be specified for one or more page elements. A page element can be in the form of text, an image, a vector-based graphic, and/or other item(s). Height 610 and/or Width 620 may be specified with regards to a Reference (614 and 626). The Reference may be the page as a whole, one or more columns on the page, or the page content—which, in this context, means the margin on any side of the page. Number values (612 and 622) for Height 610 and Width 620 may be expressed as a percentage or a multiplier of the page, column, or content. Furthermore, once Height 610 is defined relative to a Reference (page, column, content) 614, an additional attribute may be defined for the top or bottom 616 of the referenced area. In a similar fashion, once Width 620 is defined relative to a Reference (page, column, content), an additional attribute of Position 624 may be defined for the left, right, or center of the referenced area 626.

One or more anchor points 630 may also be specified relative to a reference, which can be relative to the page as a whole, relative to one or more columns on the page, or relative to the page content—which, in this context, means the margin on any side of the page. A Vertical Anchor 632 may have a position 636 of the left, right, center, top, or bottom of the Reference (page, column, content) 634. In a similar fashion, a Horizontal Anchor 638 may have a position 637 at the left, right, center, top, or bottom of the Reference (page, column, content) 635.

Offset 650 is another optional attribute that may be set after defining one or more Anchors 630. One non-limiting example of using Offset in a page element is when the user wants a headline or an image to "hang over" the margin by a slight amount. Vertical Offset 652 may be referenced to the page, column, or content as specified for the reference 634 of vertical anchor 632. A number field 654 is provided for specifying the vertical offset. The amount of the vertical offset may be expressed in pixels 658 or some other unit of measure, such as points, centimeters, and so on. In a similar fashion, a Horizontal Offset 660 may be referenced to the page, column, or content as specified for the reference 635 of horizontal anchor 638. A number field 656 is provided for specifying the horizontal offset. The amount of the horizontal offset may be expressed in pixels or some other unit of measure 668. In one implementation, Vertical Offset 652 and/or Horizontal Offset 660 can be positioned to the left, right or center of the Reference for the respective anchor (vertical or horizontal).

In one implementation, the system may use the terms described above with respect to FIG. 8. However, it will be appreciated that one, some, or all of the terms may be given different names in another implementation of the system.

In one implementation of the system, some or all of the attributes may be set in a dialogue box as described above. In another implementation of the system, some or all of the attributes may be set by clicking on a Preview image 670 and/or utilizing a Proxy 680 to specify positioning. One non-limiting example of this is to use one or more nodes of the Proxy 680 to specify one or more anchor points or offset(s). In yet another implementation of the system, a drag-and-drop method may be used by dragging specified attributes onto a Preview pane. In yet another implementation of the system, entering values, using a preview pane, using a proxy, and/or using drag-and-drop features may be used in any combination.

Figure 9:
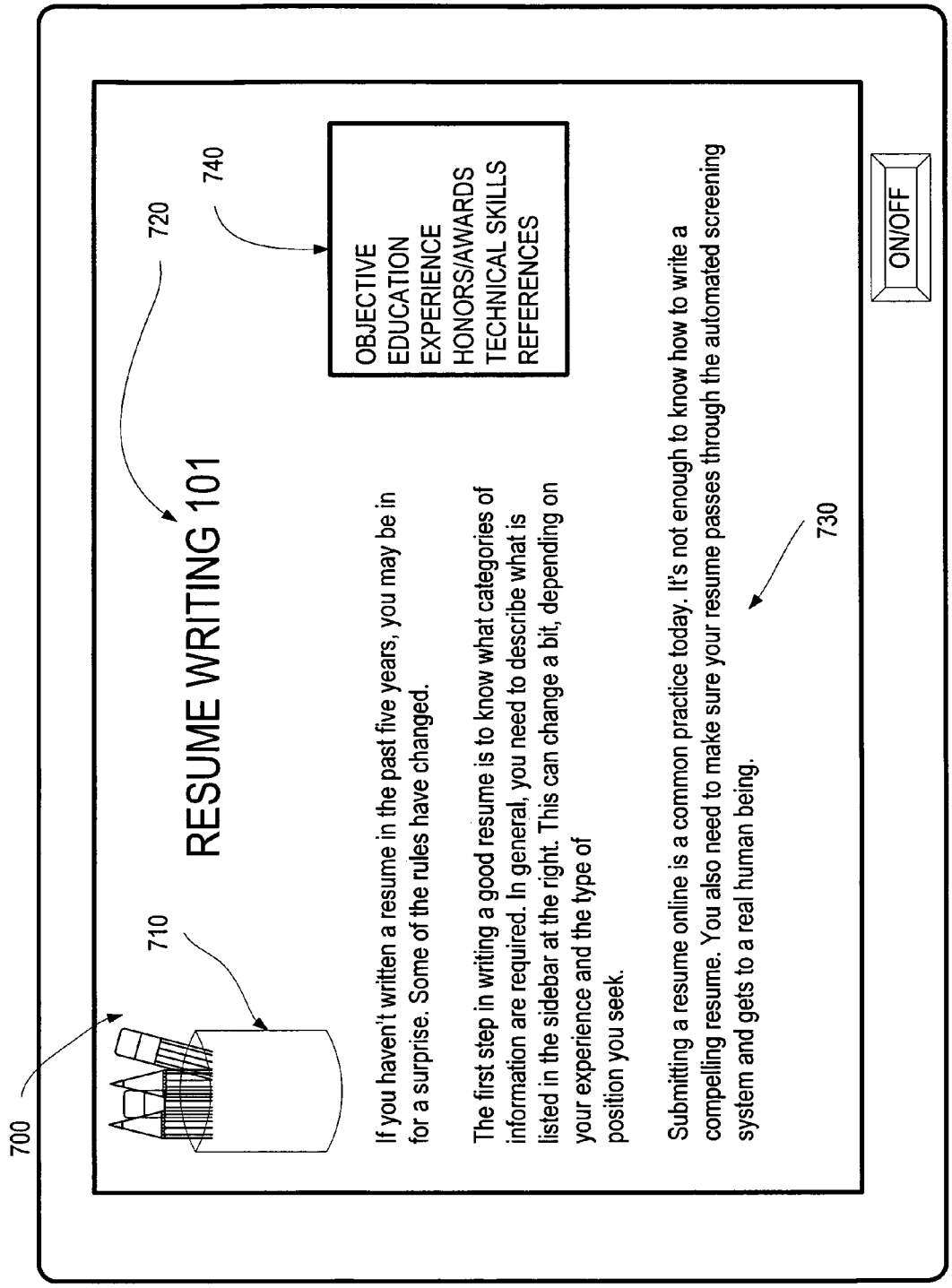
FIG. 9 is a simulated screen for one implementation of the system of FIG. 1 that illustrates one possible rendering of content on an output display as defined in FIGS. 7 and 8.

Turning now to FIG. 9, a simulated screen 700 is shown to illustrate a sample that utilizes dynamic page sizing/positioning application 200 on an output device that has a horizontal orientation. This screen and/or others like it can be displayed to user(s) on output device(s) 111. By way of example and not limitation, the output device involved may be a computer monitor, an oversized plasma screen display in a university classroom, or any number of other output devices that display page content in a horizontal format.

Simulated screen 700 consists of a single-column layout, in which a graphic 710 is anchored at the top along the left margin of the page. The page heading 720 appears at the top, followed by text 730 of the document. A sidebar 740 of text that is treated like a graphic is anchored at the right of the page. The user can specify these rendering specifications using a user interface similar to FIG. 8, or a settings file, such as one similar to FIG. 7. Attributes can be defined for any or every other element on this page: the graphic, the text, and/or the sidebar.

Figure 10:
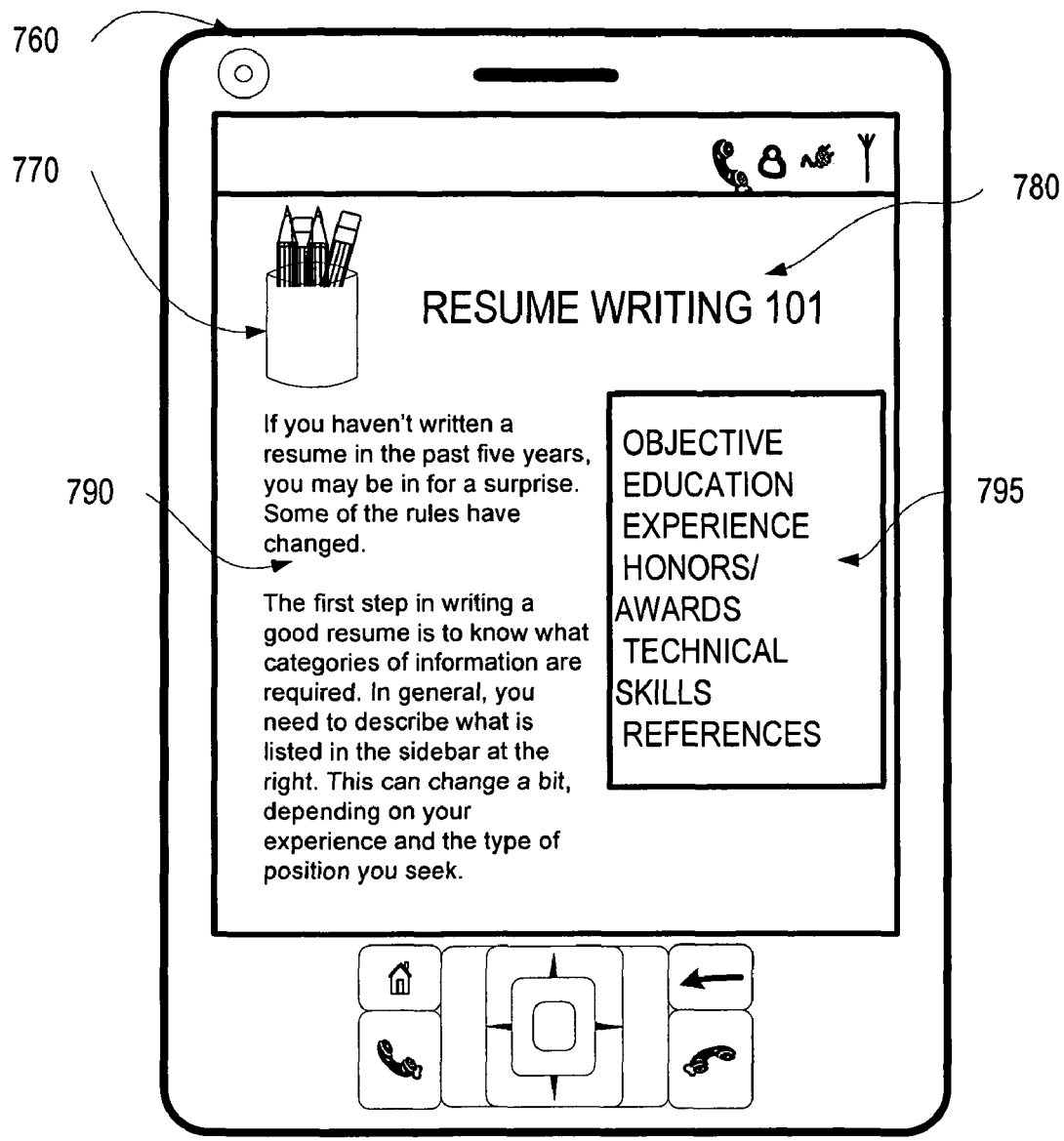
FIG. 10 is a simulated screen for one implementation of the system of FIG. 1 that illustrates another possible rendering of the same content on another output display as defined in FIGS. 7 and 8.

Turning now to FIG. 10, with continued reference to FIG. 9, a simulated screen 760 is shown to illustrate the same page that utilizes dynamic page sizing/positioning application 200 on a different output device—in this case, one that displays content in a vertical orientation. This screen and/or others like it can be displayed to user(s) on output device(s) 111. By way of example and not limitation, the output device involved may be a PDA, a mobile phone, or any number of other output devices that display page content in a vertical format. Because this page was previously assigned sizing and/or positioning attributes, a dynamic page reflow model adjusted the elements according to the type and size of the output device, while maintaining the pre-defined relationships of the page elements and their positions. Thus, the graphic 770 remains at the top left of the page; heading 780 follows, the sidebar 795 still appears anchored to the right margin, text 790 follows, and so on. Note that the content was adjusted to fit the vertical aspect ratio of the output device; therefore, each column is narrower than that of FIG. 9 and the size of each element is smaller. However, all elements still appear in the correct relation to each other.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A method for displaying one or more elements on a page, comprising:
    receiving a request to display a particular page on a particular target output device;
    retrieving a rendering specification value for an attribute of a first element in the particular page, the rendering specification value retrieved from a settings file for the particular page, the settings file comprising a name tag specifying the first element and a value tag specifying the rendering specification value, the rendering specification value comprising one or more of:
        a value for a height attribute of the first element;
        a value for a width attribute of the first element;
        a value for an anchor attribute for the first element; and
        a value for an offset attribute for the first element;
    determining whether the retrieved rendering specification value for the first element is relative or absolute;
    determining if the rendering specification value is valid based on whether the particular page comprises a maximum allowable value for the first element that is smaller than the rendering specification value;
    determining a rendering specification for the attribute corresponding to the rendering specification value, comprising:
        if the rendering specification value for the first element is relative and valid, determining the rendering specification by applying the rendering specification value to a dynamic page size for the particular page, the dynamic page size is a size of the particular page when rendered on the particular target output device;
        if the rendering specification value for the first element is relative and not valid, determining the rendering specification by applying the maximum allowable value to the dynamic page size instead of applying the rendering specification value:
        if the rendering specification value for the first element is absolute and valid, using the rendering specification value as the rendering specification; and
        if the rendering specification value for the first element is absolute and not valid, using the maximum allowable value as the rendering specification instead of using the rendering specification value; and
    providing an output, based on the rendering specification, for displaying the first element on the particular page on the particular target output device.

2. The method of claim 1, comprising providing a user interface (UI) configured to allow a user to specify one or more rendering specifications for an element by allowing the user to specify one or more respective values for one or more attributes of the element.

3. The method of claim 2, the UI configured to allow the user to specify one or more of:
    a value for an anchor attribute for the element;
    a value for a height attribute of the element;
    a value for a width attribute of the element; and
    a value for an offset attribute for the element.

4. The method of claim 1, the particular page comprising a particular document.

5. The method of claim 1, the settings file comprising an extensible application markup language format.

6. The method of claim 1, the first element comprising one of:
    a graphical element in the particular page;
    a table element in the particular page; and
    a text-based element in the particular page.

7. The method of claim 1, determining whether the retrieved rendering specification value for the first element is relative comprising one or more of:
  determining whether the rendering specification value is based on a percentage of a second size of the particular page; and
  determining whether the rendering specification value is based on relative units that are comprised in the particular page.

8. The method of claim 1, the first element comprising a particular portion of text in the particular page.

9. The method of claim 1, the anchor attribute related to a reference point selected from a group consisting of a particular column, a particular content, and a second particular page.

10. The method of claim 1, comprising retrieving the rendering specification value from a storage location identified by the settings file.

11. A system for displaying one or more elements on a page, comprising:
  a request receiving component configured to receive a request to display a particular page on a particular target output device;
  a rendering specification retrieval component operably coupled with the request receiving component and configured to retrieve a rendering specification value for an attribute of a first element in the particular page from a settings file for the particular page, the settings file comprising a name tag specifying the first element and a value tag specifying the rendering specification value, the rendering specification value comprising one or more of:
    a value for a height attribute of the first element;
    a value for a width attribute of the first element;
    a value for an anchor attribute for the first element; and
    a value for an offset attribute for the first element;
  a relative value determination component operably coupled with the rendering specification retrieval component, and configured to determine whether the rendering specification value for the first element is relative or absolute, and configured to determine if the rendering specification value is valid based on whether the particular page comprises a maximum allowable value for the first element that is smaller than the rendering specification value;
  a rendering specification determination component operably coupled with the relative determination component, and configured to determine a rendering specification for the attribute corresponding to the rendering specification value by:
    if the rendering specification value for the first element is relative and valid, determining the rendering specification by applying the rendering specification value to a dynamic page size for the particular page, the dynamic page size is a size of the particular page when rendered on the particular target output device;
    if the rendering specification value for the first element is relative and not valid, determining the rendering specification by applying the maximum allowable value to the dynamic page size instead of applying the rendering specification value;
    if the rendering specification value for the first element is absolute and valid, using the rendering specification value as the rendering specification; and
    if the rendering specification value for the first element is absolute and not valid, using the maximum allowable value as the rendering specification instead of using the rendering specification value; and
  a display value outputting component operably coupled with the rendering specification determination component, and configured to provide an output, based on the rendering specification, for displaying the first element on the particular page on the particular target output device, at least some of the system implemented at least in part via a processing unit.

12. The system of claim 11, comprising a user interface (UI) configured to allow a user to specify one or more rendering specifications for an element by allowing the user to specify one or more respective values for one or more attributes of the element.

13. The system of claim 11, the rendering specification determination component configured to:
  if the rendering specification value provides for the first element to be three columns wide but the particular page merely comprises a number of columns less than three, use the number of columns less than three as the rendering specification instead of three columns.

14. The system of claim 11, the rendering specification determination component configured to:
  if the rendering specification value provides for the first element to be three columns wide and the particular page comprises a number of columns greater than three, use three columns as the rendering specification instead of the number of columns greater than three.

15. The system of claim 11, the rendering specification value associated with a position of the first element in the particular page, the position comprising a reference point selected from a group consisting of a top position, a bottom position, a left position, a right position, and a center position.

16. The system of claim 11, comprising a rendering specification storing component configured to provide for storing the rendering specification value for the first element in a manner that associates the rendering specification value with a settings file for the first element.

17. The system of claim 11, the relative value determination component configured to determine the rendering specification of the attribute of the first element relative to page units if the rendering specification value is based on relative units that are comprised in the particular page.

18. The system of claim 11, the particular page comprising a particular document.

19. The system of claim 16, the rendering specification retrieval component configured to retrieve the rendering specification value for the first element from a location identified by the settings file for the first element.

20. A computer storage media comprising instructions that when executed via a processing unit perform a method for displaying one or more elements on a page, the method comprising:
  receiving a request to display a particular page on a particular target output device;
  retrieving a rendering specification value for an attribute of a first element in the particular page, the rendering specification value retrieved from a settings file for the particular page, the settings file comprising a name tag specifying the first element and a value tag specifying the rendering specification value, the rendering specification value comprising one or more of:
    a value for a height attribute of the first element;
    a value for a width attribute of the first element;
    a value for an anchor attribute for the first element; and
    a value for an offset attribute for the first element;
  determining whether the retrieved rendering specification value for the first element is relative or absolute;

determining if the rendering specification value is valid based on whether the particular page comprises a maximum allowable value for the first element that is smaller than the rendering specification value;

determining a rendering specification for the attribute corresponding to the rendering specification value by:

if the rendering specification value for the first element is relative and valid, determining the rendering specification by applying the rendering specification value to a dynamic page size for the particular page, the dynamic page size is a size of the particular page when rendered on the particular target output device;

if the rendering specification value for the first element is relative and not valid, determining the rendering specification by applying the maximum allowable value to the dynamic page size instead of applying the rendering specification value;

if the rendering specification value for the first element is absolute and valid, using the rendering specification value as the rendering specification; and if the rendering specification value for the first element is absolute and not valid, using the maximum allowable value as the rendering specification instead of using the rendering specification value; and providing an output, based on the rendering specification, for displaying the first element on the particular page on the particular target output device

* * * * *